US012750764B2

(12) United States Patent
Mu

(10) Patent No.: US 12,750,764 B2
(45) Date of Patent: Sep. 29, 2026

(54) METHOD AND APPARATUS FOR RECEIVING OR SENDING DEDICATED SYSTEM MESSAGE REQUIRED FOR A TERMINAL TO ACCESS A CELL, AND NON-TRANSITORY COMPUTER-READABLE STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 305 days.

(21) Appl. No.: 18/681,343

(22) PCT Filed: Aug. 5, 2021

(86) PCT No.: PCT/CN2021/110840
§ 371 (c)(1),
(2) Date: Feb. 5, 2024

(87) PCT Pub. No.: WO2023/010407
PCT Pub. Date: Feb. 9, 2023

(65) Prior Publication Data
US 2024/0349171 A1 Oct. 17, 2024

(51) Int. Cl.
*H04W 48/02* (2009.01)
*H04W 72/0457* (2023.01)
(Continued)

(52) U.S. Cl.
CPC ....... *H04W 48/02* (2013.01); *H04W 72/0457* (2023.01); *H04W 72/231* (2023.01); *H04W 74/0816* (2013.01)

(58) Field of Classification Search
CPC ............. H04W 48/02; H04W 72/0457; H04W 72/231; H04W 74/0816; H04W 48/08; H04W 48/12
See application file for complete search history.

(56) References Cited

U.S. PATENT DOCUMENTS

2013/0336176 A1* 12/2013 Rubin .................... H04J 11/005 370/328
2015/0327141 A1* 11/2015 Jung ..................... H04W 48/16 370/331
(Continued)

FOREIGN PATENT DOCUMENTS

CN 110234148 A 9/2019
CN 110831126 A 2/2020
(Continued)

OTHER PUBLICATIONS

International Search Report mailed on Apr. 26, 2022 in PCT/CN2021/110840 filed on Aug. 5, 2021, 6 pages (with English Translation).
(Continued)

*Primary Examiner* — Tejis Daya
(74) *Attorney, Agent, or Firm* — Oblon, McClelland, Maier & Neustadt, L.L.P.

(57) ABSTRACT

A method for receiving a system message, applied to a terminal, and including receiving a dedicated system message, wherein the dedicated system message comprises a
(Continued)

system parameter required for the terminal to access a cell; where the system parameter includes at least one of following: a first parameter for determining whether to allow access to a cell; or a second parameter for performing cell access.

16 Claims, 4 Drawing Sheets

(51) Int. Cl.
*H04W 72/231* (2023.01)
*H04W 74/0816* (2024.01)

(56) References Cited

U.S. PATENT DOCUMENTS

| | | | | |
|---|---|---|---|---|
| 2015/0327155 | A1 | 11/2015 | Lee et al. | |
| 2016/0050615 | A1* | 2/2016 | Fong | H04W 68/005 455/411 |
| 2016/0165547 | A1* | 6/2016 | Ouchi | H04L 5/14 455/522 |
| 2018/0020399 | A1* | 1/2018 | Ke | H04W 48/12 |
| 2018/0324770 | A1* | 11/2018 | Nogami | H04L 5/0053 |
| 2019/0150183 | A1* | 5/2019 | Aiba | H04W 24/10 370/336 |

FOREIGN PATENT DOCUMENTS

| | | | |
|---|---|---|---|
| CN | 112237029 | A | 1/2021 |
| CN | 113454943 | A | 9/2021 |
| WO | WO 2016/053039 | A1 | 4/2016 |
| WO | WO-2021/093183 | A1 | 5/2021 |

OTHER PUBLICATIONS

"FL summary #4 for UE complexity reduction for RedCap", Moderator (Ericsson), 3GPP TSG-RAN WG1 Meeting #104-e Tdoc RI-2101852, Feb. 5, 2021 (Feb. 5, 2021), 39 pages.
"FL summary #3 for UE complexity reduction for RedCap", Moderator (Ericsson), 3GPP TSG-RAN WG1 Meeting #104-e Tdoc RI-2101851, Feb. 5, 2021 (Feb. 5, 2021), 55 pages.
ZTE, "Access control and identification for Reduced Capability NR devices", 3GPP TSG RAN WG1 #103-e, R1-2007719, 2020, 3 pages.
Qualcomm Incorporated, "Complexity Reduction for RedCap Devices", 3GPP TSG-RAN WG1 Meeting #104, R1-2101766, 2021, 13 pages.
Combined Chinese Office Action and Search Report issued Jul. 16, 2025 in Chinese Patent Application No. 202180002393.8 (with English translation), 17 pages.

* cited by examiner

METHOD AND APPARATUS FOR RECEIVING OR SENDING DEDICATED SYSTEM MESSAGE REQUIRED FOR A TERMINAL TO ACCESS A CELL, AND NON-TRANSITORY COMPUTER-READABLE STORAGE MEDIUM

CROSS REFERENCE TO RELATED APPLICATIONS

The present application is a U.S. National Phase of International Application No. PCT/CN2021/110840, filed on Aug. 5, 2021, the contents of all of which are incorporated herein by reference in their entireties for all purposes.

BACKGROUND

Technical Field

The present disclosure relates to the field of wireless communication technology, and in particular, to a method and apparatus for receiving or sending a system message, and a readable storage medium.

Description of the Related Art

In a long term evolution (LTE) system, in order to support the Internet of Things services, the following two technologies are proposed: Narrow Band Internet of Things (NB-IoT) and Machine Type Communication (MTC).

SUMMARY

According to a first aspect of the embodiments of the present disclosure, there is provided a method for receiving a system message, applied to a terminal, and including receiving a dedicated system message, where the dedicated system message includes a system parameter required for the terminal to access a cell, where the system parameter includes at least one of following: a first parameter for determining whether to allow access to a cell or a second parameter for performing cell access.

According to a second aspect of the embodiments of the present disclosure, there is provided a method for sending a system message, applied to a network device, and including sending a dedicated system message, where the dedicated system message includes a system parameter required for a terminal to access a cell, where the system parameter includes at least one of following: a first parameter for determining whether to allow access to a cell or a second parameter for performing cell access.

According to a third aspect of the embodiments of the present disclosure, there is provided an apparatus for receiving a system message, applied to a terminal, and including a processor and a memory that is configured to store an instruction executable by the processor. The processor is configured to perform the method for receiving a system message.

It should be understood that the above general description and the following detailed description are merely exemplary and explanatory, and cannot limit the present disclosure.

BRIEF DESCRIPTION OF THE DRAWINGS

The drawings described here are used to provide a further understanding of the embodiments of the present disclosure, and constitute a part of the description. The illustrative embodiments of the embodiments of the present disclosure and the description thereof are used to explain the embodiments of the present disclosure, and do not constitute an improper limitation on the embodiments of the present disclosure.

DETAILED DESCRIPTION OF THE PREFERRED EMBODIMENTS

The embodiments of the present disclosure are further described with reference to the accompanying drawings and specific embodiments.

Example embodiments will be described in detail here, examples of which are illustrated in the accompanying drawings. The following description refers to the accompanying drawings in which the same numbers in different drawings represent the same or similar elements unless otherwise represented. The implementations described in the following example embodiments do not represent all implementations consistent with the embodiments of the present disclosure. By contrast, they are merely examples of apparatuses and methods consistent with some aspects of the present disclosure as detailed in the appended claims.

NB-IoT and MTC are mainly used in scenarios of low rate and high latency, such as scenarios of meter reading and environmental monitoring. Among them, the maximum rate supported by NB-IoT is less than 1 Mbps, and the maximum rate supported by MTC is less than 10 Mbps. With the continuous development of Internet of Things services, new services such as video monitoring, smart home, wearable device, and industrial sensing and monitoring are gradually popularized. The rates required by these new services are usually greater than 10 Mbps, even greater than 100 Mbps. Meanwhile, these new services also have higher requirements for latency. Therefore, it is difficult for NB-IoT technology and MTC technology in LTE to satisfy the requirements of the above new services.

Based on this situation, it is proposed that a new terminal is designed for the new radio of the 5th Generation Mobile Communication Technology (5G) to satisfy the requirements of the new services. In the current 3rd Generation Partnership Project (3GPP) standard, this new terminal is referred to as a reduced capability (Redcap) terminal or referred to as a new radio-lite (NR-Lite) terminal. Similar to Internet of Things devices in LTE, the reduced capability terminal in 5G usually needs to satisfy the following requirements: low cost, low complexity, coverage enhancement to a certain degree, and power saving.

Since the current new radio (NR) is designed for high-end terminals with high rate and low latency, or the like, the current design cannot satisfy the requirements of the reduced capability terminal. Therefore, the current NR needs to be modified to satisfy the requirements of the reduced capability terminal.

Figure 1:
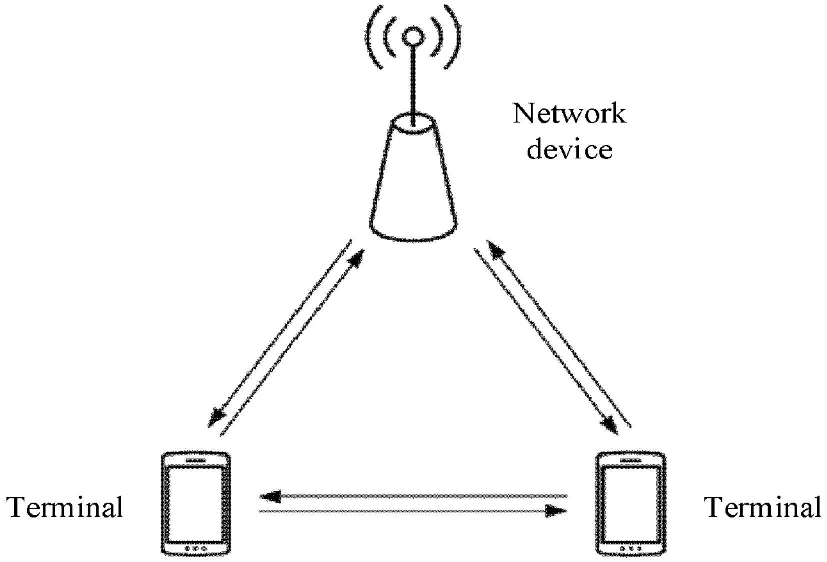
FIG. 1 is a schematic architecture diagram of communication system between a terminal and a network device illustrated according to some embodiments of the present disclosure.

FIG. 1 is a schematic architecture diagram of a communication system between a network device and a terminal illustrated according to some embodiments of the present disclosure. The communication method provided in the present disclosure may be applied to the schematic architecture diagram of the communication system shown in FIG. 1. As shown in FIG. 1, the network side device may send signaling based on the architecture shown in FIG. 1.

It may be understood that the communication system between the network device and the terminal shown in FIG. 1 is merely illustrative, and the wireless communication system may further include other network devices; for example, the wireless communication system may further include a core network device, a wireless relay device, and/or a wireless backhaul device, which are not shown in FIG. 1. In the embodiments of the present disclosure, the number of network devices and the number of terminals included in the wireless communication system are not limited.

It can be further understood that, the wireless communication system according to the embodiments of the present disclosure is a network for providing a wireless communication function. The wireless communication system may adopt different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency Division Multiple Access (OFDMA), Single Carrier FDMA (SC-FDMA), and Carrier Sense Multiple Access with Collision Avoidance. The network may be divided into a 2G (generation) network, a 3G network, a 4G network, or a future evolution network, such as a 5G network, according to the capacity, rate, latency and other factors of different networks. The 5G network may also be referred to as a new radio network (NR). For ease of description, the wireless communication network may be sometimes referred to as a network in the present disclosure.

Furthermore, the network device involved in the present disclosure may also be referred to as a wireless access network device. The wireless access network device may be a base station, an evolved NodeB (eNB), a home NodeB, an access point (AP) in a wireless fidelity (WiFi) system, a wireless relay node, a wireless backhaul node, a transmission point (TP), or a transmission and reception point (TRP), etc.; the wireless access network device may also be a gNB in an NR system, or may also be a part of devices or a component that forms a base station, etc. When the communication system is a Vehicle to Everything (V2X) communication system, the network device may also be a vehicle-mounted device. It should be understood that, the specific technology and the specific device form used by the network device are not limited in the embodiments of the present disclosure.

In a new generation of communication technology, the terminal may work based on a bandwidth part (BWP). That is, the terminal does not need to monitor the entire bandwidth, and needs to transmit and receive data on a part of the system bandwidth. In a Time Division Duplexing (TDD) system, the transceiving of uplink and downlink data may share the same bandwidth part. Therefore, in order to reduce the latency of switching between uplink and downlink, the downlink (DL) BWP and the uplink BWP are required to have the same center frequency point.

Furthermore, the terminal involved in the present disclosure may also be referred to as a terminal device, user equipment (UE), a mobile station (MS), a mobile terminal (MT), etc., which is a device for providing voice and/or data connectivity to a user; for example, the terminal may be a handheld device having a wireless connection function, a vehicle-mounted device, etc. Currently, some examples of the terminal include a mobile phone, a pocket personal computer (PPC), a palm computer, a personal digital assistant (PDA), a notebook computer, a tablet computer, a wearable device, or a vehicle-mounted device, etc. In addition, when the communication system is a Vehicle to Everything (V2X) communication system, the terminal device may also be a vehicle-mounted device. It should be understood that the specific technology and the specific device form used by the terminal are not limited in the embodiments of the present disclosure.

When the terminal is a reduced capability terminal, since the current NR is designed for high-end terminals with high rate and low latency, or the like, the current design cannot satisfy the above requirements of the reduced capability terminal. Therefore, the current NR system needs to be modified to satisfy the requirements of the reduced capability terminal.

The reduced capability terminal may be modified as follows.

In order to satisfy the requirements of the reduced capability terminal for low cost, low complexity, or the like, the radio frequency (RF) bandwidth of the reduced capability terminal may be limited, for example, may be limited to 5 MHz or 10 MHz; or, the cache capacity of the reduced capability terminal may be limited, thus limiting the size of the transmission block to be received each time, etc.

In order to satisfy the requirements of the reduced capability terminal for low power, the communication process can be simplified, and the number of times of detecting the downlink control channel by the reduced capability terminal can be reduced, or the like.

The transport protocol may be modified as follows.

Since the reduced capability terminal may work based on the BWP, regardless for the original initial DL BWP and the original initial UL BWP, or for the additional initial DL BWP and the additional initial UL BWP, channel-related information transmitted on these BWPs needs to be configured. Since there are many differences between the transmission parameters of the reduced capability terminal and the transmission parameters of the conventional NR terminal, many cell-level parameters (such as access control parameters) also need to be separately defined.

Since the capacity of the current first type system information block (SIB1) is limited (only about 2200 bits), if all configurations of the initial DL BWP and the initial UL BWP and other access parameters of the reduced capability terminal are both configured in the SIB1, the problem of insufficient capacity may occur. Therefore, there is a need to solve the problem of insufficient capacity that may occur.

Figure 2:
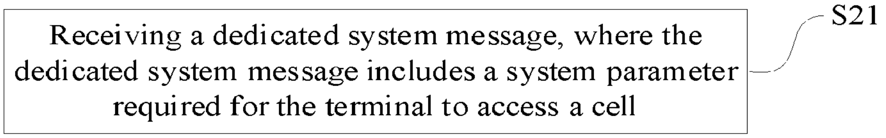
FIG. 2 is a flowchart of a method for receiving a system message illustrated according to some embodiments of the present disclosure.

According to embodiments of the present disclosure, there is provided a method for receiving a system message, applied to a terminal. Referring to FIG. 2, FIG. 2 is a flowchart of a method for receiving a system message illustrated according to some embodiments of the present disclosure. As shown in FIG. 2, the method for receiving a system message includes the following.

In step S21, a dedicated system message is received, where the dedicated system message includes a system parameter required for the terminal to access a cell.

In an embodiment, the terminal is a reduced capability terminal.

In an embodiment, the system parameter includes at least one of the following: a first parameter for determining whether to allow access to a cell, or a second parameter for performing cell access.

That is, according to the system parameter, it can be determined whether to allow access to a cell and/or perform cell access. In some embodiments, the second parameter for performing cell access may be a second parameter for performing cell access after determining that access to a cell is allowed.

In an embodiment, the second parameter includes at least one of the following:

configuration information of a downlink bandwidth part (DL BWP), configuration information of an uplink bandwidth part (UL BWP), configuration information of a downlink physical channel, or configuration information of an uplink physical channel.

In some embodiments, the configuration information of the downlink bandwidth part (DL BWP) at least includes: position information of the frequency resource of the downlink bandwidth part, the resource amount of the occupied frequency domain resource, and the subcarrier spacing.

The configuration information of the uplink bandwidth part (UL BWP) at least includes: position information of the frequency resource of the uplink bandwidth part, the resource amount of the occupied frequency domain resource, and the subcarrier spacing.

The configuration information of the downlink physical channel at least includes configuration information of the PDCCH which at least includes control resource set (CORESET) information and search space information, and configuration information of the PDSCH.

The configuration information of the uplink physical channel at least includes: configuration information of the PUCCH, configuration information of the PRACH, and configuration information of the PUSCH.

In an embodiment, the method further includes: determining the capacity of the dedicated system message according to the information amount of the system parameter required for the terminal to access the cell, thus making the capacity of the dedicated carrier message more reasonable and preventing the waste of air-interface resources.

In the embodiments of the present disclosure, the system parameter required for the terminal to access the cell may be used as the cell-level parameter of the terminal, and the dedicated system message is configured for the system parameter required for the terminal to access the cell, so that the dedicated system message is only used to carry the system parameter required for the terminal to access the cell. Therefore, the capacity of the dedicated system message can be determined according to the information amount of the system parameter required for the terminal to access the cell, thus making the capacity of the dedicated carrier message more reasonable, and preventing the waste of air-interface resources. In addition, the message allocation can be definite and clear through configuring the dedicated carrier message for the system parameter required for the terminal to access the cell.

Figure 3:
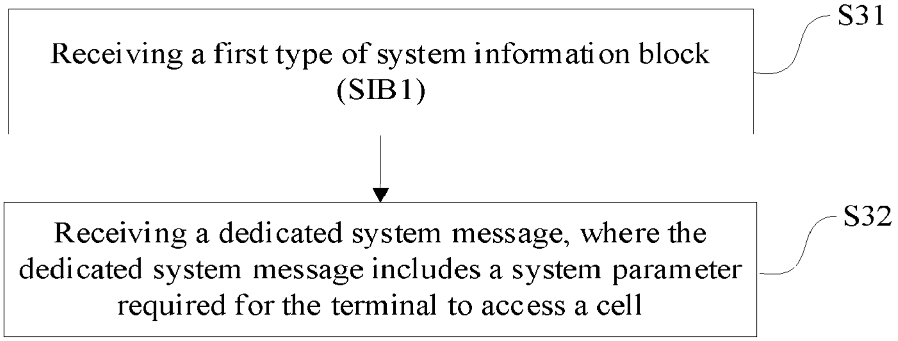
FIG. 3 is a flowchart of a method for receiving a system message illustrated according to some embodiments of the present disclosure.

According to embodiments of the present disclosure, there is provided a method for receiving a system message, applied to a terminal. Referring to FIG. 3, FIG. 3 is a flowchart of a method for receiving a system message illustrated according to some embodiments of the present disclosure. As shown in FIG. 3, the method for receiving a system message includes the following.

In step S31, a first type of system information block (SIB1) is received.

In step S32, a dedicated system message is received, where the dedicated system message includes a system parameter required for the terminal to access a cell.

Among them, the description of step S32 is similar to step S21, and details are not described here again.

Among them, the dedicated system message is not within the first type of system information block (SIB1), that is, the first type of system information block (SIB1) does not include the dedicated system message. Therefore, a dedicated system message is designed for the reduced capability terminal to carry the cell-level information dedicated for the reduced capability terminal, so that all configurations of the initial DL BWP and the initial UL BWP and other access parameters of the reduced capability terminal do not need to be both placed in the first type of system information block.

In an embodiment, the dedicated system message includes a system parameter required for the terminal to access a cell, and the system parameter includes at least one of the following: a first parameter for determining whether to allow access to a cell, or a second parameter for performing cell access.

In the embodiments of the present disclosure, the dedicated system message is configured for the system parameter required for the terminal to access the cell, and the dedicated system message is not included in the SIB1, so that the system parameter required for the terminal to access the cell does not need to occupy the capacity of the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

Figure 4:
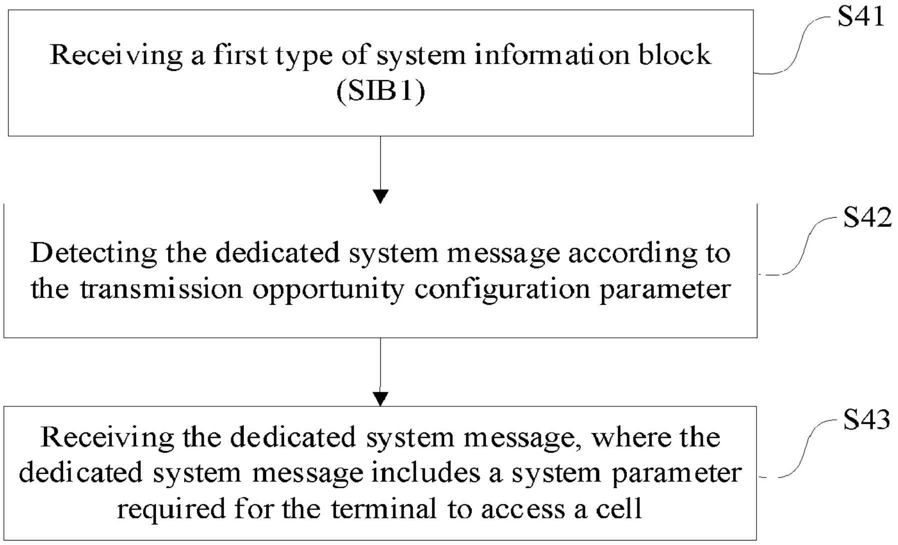
FIG. 4 is a flowchart of a method for receiving a system message illustrated according to some embodiments of the present disclosure.

According to embodiments of the present disclosure, there is provided a method for receiving a system message, applied to a terminal. Referring to FIG. 4, FIG. 4 is a flowchart of a method for receiving a system message illustrated according to some embodiments of the present disclosure. As shown in FIG. 4, the method for receiving a system message includes the following.

In step S41, a first type of system information block (SIB1) is received, where the first type of system information block (SIB1) includes a transmission opportunity configuration parameter corresponding to a dedicated system message.

In step S42, the dedicated system message is detected according to the transmission opportunity configuration parameter.

In step S43, the dedicated system message is received, where the dedicated system message includes a system parameter required for the terminal to access a cell.

Among them, the description of step S43 is similar to step S21, and details are not described here again.

Among them, the dedicated system message is not within the first type of system information block (SIB1), that is, the first type of system information block (SIB1) does not include the dedicated system message.

In some embodiments, the system parameter includes at least one of the following: a first parameter for determining whether to allow access to a cell, or a second parameter for performing cell access.

Among them, the second parameter for performing cell access is a second parameter for performing cell access after determining that access to a cell is allowed.

In some embodiments, the transmission opportunity configuration parameter includes at least one of the following: a transmission period or a transmission time window parameter.

In the embodiments of the present disclosure, the dedicated system message is configured for the system parameter required for the terminal to access the cell, and the dedicated system message is not included in the SIB1. The transmission opportunity configuration parameter of the dedicated system message is carried by using the SIB1, so that the transmission opportunity configuration parameter occupies less capacity in the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

Figure 5:
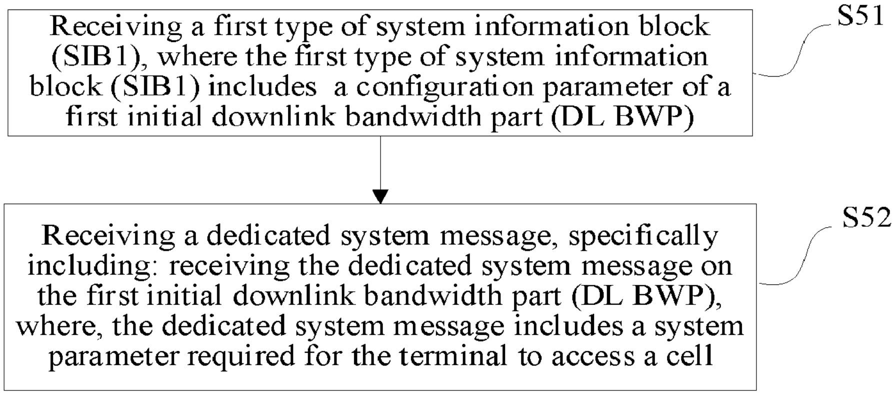
FIG. 5 is a flowchart of a method for receiving a system message illustrated according to some embodiments of the present disclosure.

According to embodiments of the present disclosure, there is provided a method for receiving a system message, applied to a terminal. Referring to FIG. 5, FIG. 5 is a flowchart of a method for receiving a system message illustrated according to some embodiments of the present disclosure. As shown in FIG. 5, the method for receiving a system message includes the following.

In step S51, a first type of system information block (SIB1) is received, where the first type of system information block (SIB1) includes a configuration parameter of a first initial downlink bandwidth part (DL BWP);

In step S52, a dedicated system message is received. The method specifically includes that the dedicated system message is received on the first initial downlink bandwidth part (DL BWP), where the dedicated system message includes a system parameter required for the terminal to access a cell.

Among them, the description of step S52 is similar to step S21, and details are not described here again.

Among them, the dedicated system message is not within the first type of system information block (SIB1), that is, the first type of system information block (SIB1) does not include the dedicated system message.

In some embodiments, between the step S51 and the step S52, the method further includes that a time-frequency resource of the first initial downlink bandwidth part is determined according to the configuration parameter of the first initial downlink bandwidth part (DL BWP).

In the embodiments of the present disclosure, the dedicated system message is configured for the system parameter required for the terminal to access the cell, and the dedicated system message is not included in the SIB1. The transmission opportunity configuration parameter of the dedicated system message is carried by using the SIB1, so that the transmission opportunity configuration parameter occupies less capacity in the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

Figure 6:
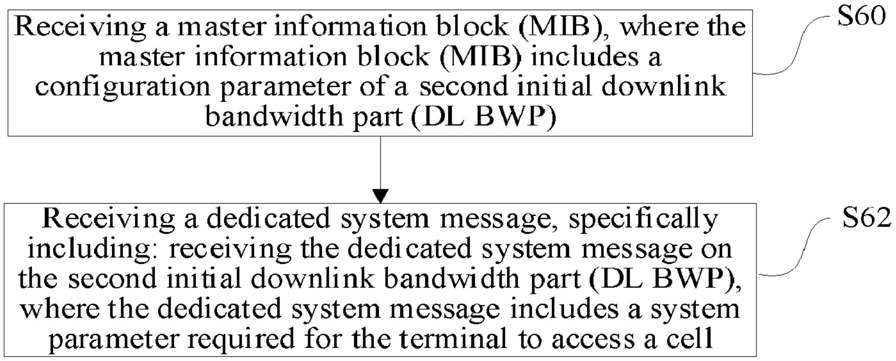
FIG. 6 is a flowchart of a method for receiving a system message illustrated according to some embodiments of the present disclosure.

According to embodiments of the present disclosure, there is provided a method for receiving a system message, applied to a terminal. Referring to FIG. 6, FIG. 6 is a flowchart of a method for receiving a system message illustrated according to some embodiments of the present disclosure. As shown in FIG. 6, the method for receiving a system message includes the following.

In step S60, a master information block (MIB) is received, where the master information block (MIB) includes a configuration parameter of a second initial downlink bandwidth part (DL BWP).

In step S62, a dedicated system message is received. The method specifically includes that the dedicated system message is received on the second initial downlink bandwidth part (DL BWP), where the dedicated system message includes a system parameter required for the terminal to access a cell.

Among them, the description of step S62 is similar to step S21, and details are not described here again. In the embodiments of the present disclosure, the dedicated system message is configured for the system parameter required for the terminal to access the cell, and the dedicated system message is not included in the SIB1. The configuration parameter of the dedicated system message is also not included in the SIB1, so that there is no need to occupy the capacity of the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

According to embodiments of the present disclosure, there is provided a method for receiving a system message, applied to a terminal. The method for receiving a system message includes the following.

In step S60, a master information block (MIB) is received, where the master information block (MIB) includes a configuration parameter of a second initial downlink bandwidth part (DL BWP).

In step S61, a first type of system information block (SIB1) is received.

In step S62, a dedicated system message is received. The method specifically includes that the dedicated system message is received on the second initial downlink bandwidth part (DL BWP), where the dedicated system message includes a system parameter required for the terminal to access a cell.

Among them, the dedicated system message is not within the first type of system information block (SIB1), that is, the first type of system information block (SIB1) does not include the dedicated system message.

According to embodiments of the present disclosure, there is provided a method for receiving a system message, applied to a terminal. The method for receiving a system message includes the following.

In step S1-1, a first physical downlink control channel (PDCCH) is received, where the first PDCCH includes a modulation control parameter of a dedicated system message.

In step S2-1, the dedicated system message is received, where the dedicated system message includes a system parameter required for the terminal to access a cell.

In some embodiments, the system parameter includes at least one of the following: a first parameter for determining whether to allow access to a cell, or a second parameter for performing cell access.

In some embodiments, the second parameter for performing cell access is a second parameter for performing cell access after determining that access to a cell is allowed.

In some embodiments, receiving a dedicated system message includes receiving the dedicated system message according to the modulation control parameter.

In some embodiments, the modulation control parameter includes at least one of a modulation encoding mode or a frequency domain position.

It should be understood that the description of receiving a dedicated system message in the foregoing embodiments may also be applicable to the present embodiment, and details are not described here again.

According to embodiments of the present disclosure, there is provided a method for receiving a system message, applied to a terminal. The method for receiving a system message includes the following.

In step S1-1', a second physical downlink control channel (PDCCH) is received, where the second PDCCH includes a modulation control parameter of the dedicated system message, the second PDCCH further includes a modulation control parameter of a first type of system information block (SIB1), and the second PDCCH is different from the first PDCCH.

In step S1-2', the dedicated system message is received, where, the dedicated system message includes a system parameter required for the terminal to access a cell.

In some embodiments, the system parameter includes at least one of the following: a first parameter for determining whether to allow access to a cell, or a second parameter for performing cell access.

In some embodiments, the second parameter for performing cell access is a second parameter for performing cell access after determining that access to a cell is allowed.

It should be understood that the description of receiving a dedicated system message in the foregoing embodiments may also be applicable to the present embodiment, and details are not described here again.

According to embodiments of the present disclosure, there is provided a method for receiving a system message, applied to a terminal. The method for receiving a system message includes the following.

In step S1-1", a first type of system information block (SIB1) is received, where the first type of system information block (SIB1) includes a modulation control parameter of the dedicated system message.

In step S1-2", the dedicated system message is received, where the dedicated system message includes a system parameter required for the terminal to access a cell.

In some embodiments, the system parameter includes at least one of the following: a first parameter for determining whether to allow access to a cell, or a second parameter for performing cell access.

In some embodiments, the second parameter for performing cell access is a second parameter for performing cell access after determining that access to a cell is allowed.

Among them, receiving a dedicated system message includes: receiving the dedicated system message according to the modulation control parameter.

In some embodiments, the modulation control parameter includes at least one of a modulation encoding mode or a frequency domain position.

It should be understood that the description of receiving a dedicated system message in the foregoing embodiments may also be applicable to the present embodiment, and details are not described here again.

Figure 7:
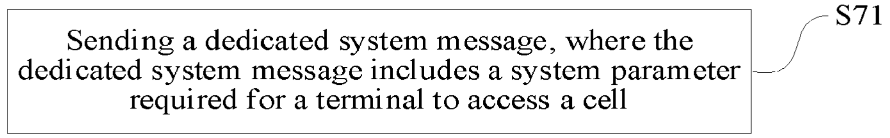
FIG. 7 is a flowchart of a method for sending a system message illustrated according to some embodiments of the present disclosure.

According to embodiments of the present disclosure, there is provided a method for sending a system message, applied to a network device. Referring to FIG. 7, FIG. 7 is a flowchart of a method for sending a system message illustrated according to some embodiments of the present disclosure. As shown in FIG. 7, the method for sending a system message includes the following.

In step S71, a dedicated system message is sent, where the dedicated system message includes a system parameter required for a terminal to access a cell.

In some embodiments, the terminal is a reduced capability terminal.

In some embodiments, the system parameter includes at least one of the following: a first parameter for determining whether to allow access to a cell, or a second parameter for performing cell access.

In some embodiments, the second parameter for performing cell access is a second parameter for performing cell access after determining that access to a cell is allowed.

That is, according to the system parameter, it can be determined whether to allow access to a cell and/or perform cell access.

In some embodiments, the second parameter includes at least one of the following:

- configuration information of a downlink bandwidth part (DL BWP), configuration information of an uplink bandwidth part (UL BWP), configuration information of a downlink physical channel, or configuration information of an uplink physical channel.

In some embodiments, the method further includes: determining the capacity of the dedicated system message according to the information amount of the system parameter required for the terminal to access the cell, thus making the capacity of the dedicated carrier message more reasonable and preventing the waste of air-interface resources.

In the embodiments of the present disclosure, the system parameter required for the terminal to access the cell may be used as the cell-level parameter of the terminal, and the dedicated system message is configured for the system parameter required for the terminal to access the cell, so that the dedicated system message is only used to carry the system parameter required for the terminal to access the cell. Therefore, the capacity of the dedicated system message can be determined according to the information amount of the system parameter required for the terminal to access the cell, thus making the capacity of the dedicated carrier message more reasonable, and preventing the waste of air-interface resources. In addition, the message allocation can be definite and clear through configuring the dedicated carrier message for the system parameter required for the terminal to access the cell.

Figure 8:
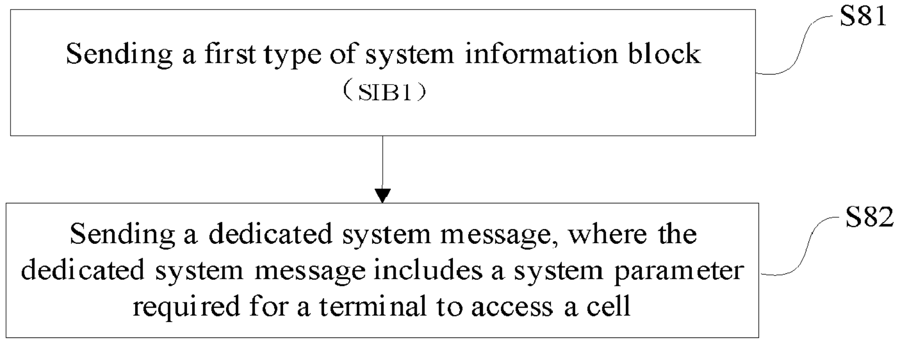
FIG. 8 is a flowchart of a method for sending a system message illustrated according to some embodiments of the present disclosure.

According to embodiments of the present disclosure, there is provided a method for sending a system message, applied to a network device. Referring to FIG. 8, FIG. 8 is a flowchart of a method for sending a system message illustrated according to some embodiments of the present disclosure. As shown in FIG. 8, the method for sending a system message includes the following.

In step S81, a first type of system information block (SIB1) is sent.

In step S82, a dedicated system message is sent, where the dedicated system message includes a system parameter required for a terminal to access a cell.

Among them, the dedicated system message is not within the first type of system information block (SIB1), that is, the first type of system information block (SIB1) does not include the dedicated system message.

Among them, the description of step S82 is similar to step S71, and details are not described here again.

In some embodiments, the method further includes: determining the capacity of the dedicated system message according to the information amount of the system parameter required for the terminal to access the cell, thus making the capacity of the dedicated carrier message more reasonable and preventing the waste of air-interface resources.

In the embodiments of the present disclosure, the dedicated system message is configured for the system parameter required for the terminal to access the cell, and the dedicated system message is not included in the SIB1, so that the system parameter required for the terminal to access the cell does not need to occupy the capacity of the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

According to embodiments of the present disclosure, there is provided a method for sending a system message, applied to a network device. The method includes the following.

A first type of system information block (SIB1) is sent, where the first type of system information block SIB1 includes a transmission opportunity configuration parameter corresponding to the dedicated system message;

The transmission opportunity configuration parameter is used to enable the terminal to detect the dedicated system message according to the transmission opportunity configuration parameter.

The dedicated system message is sent, where the dedicated system message includes a system parameter required for the terminal to access a cell.

Among them, the first type of system information block SIB1 does not include the dedicated system message, where the dedicated system message includes a system parameter required for the terminal to access a cell.

Among them, the dedicated system message is not within the first type of system information block (SIB1), that is, the first type of system information block (SIB1) does not include the dedicated system message.

Among them, the description of the sending the dedicated system message is similar to step S71, and details are not described here again.

In some embodiments, the transmission opportunity configuration parameter includes at least one of the following: a transmission period or a transmission time window parameter.

In the embodiments of the present disclosure, the dedicated system message is configured for the system parameter required for the terminal to access the cell, and the dedicated system message is not included in the SIB1. The transmission opportunity configuration parameter of the dedicated system message is carried by using the SIB1, so that the transmission opportunity configuration parameter occupies less capacity in the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

According to embodiments of the present disclosure, there is provided a method for sending a system message, applied to a network device. The method includes the following.

A first type of system information block (SIB1) is sent, where the first type of system information block (SIB1) includes a configuration parameter of a first initial downlink bandwidth part (DL BWP).

A dedicated system message is sent. The method specifically includes that the dedicated system message is sent on the first initial downlink bandwidth part (DL BWP), where the dedicated system message includes a system parameter required for the terminal to access a cell.

Among them, the dedicated system message is not within the first type of system information block (SIB1), that is, the first type of system information block (SIB1) does not include the dedicated system message.

Among them, the description of the sending the dedicated system message is similar to step S71, and details are not described here again.

In the embodiments of the present disclosure, the dedicated system message is configured for the system parameter required for the terminal to access the cell, and the dedicated system message is not included in the SIB1. The transmission opportunity configuration parameter of the dedicated system message is carried by using the SIB1, so that the transmission opportunity configuration parameter occupies less capacity in the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

According to embodiments of the present disclosure, there is provided a method for sending a system message, which are applied to a network device. The method includes the following.

A master information block (MIB) is sent, where the master information block (MIB) includes a configuration parameter of a second initial downlink bandwidth part (DL BWP).

Sending the dedicated system message specifically includes: sending the dedicated system message on the second initial downlink bandwidth part (DL BWP), where the dedicated system message includes a system parameter required for the terminal to access a cell.

Among them, the description of sending the dedicated system message is similar to step S71, and details are not described here again.

Among them, the dedicated system message is not within the first type of system information block (SIB1), that is, the first type of system information block (SIB1) does not include the dedicated system message.

In the embodiments of the present disclosure, the dedicated system message is configured for the system parameter required for the terminal to access the cell, and the dedicated system message is not included in the SIB1. The configuration parameter of the dedicated system message is also not included in the SIB1, so that there is no need to occupy the capacity of the SIB1, thus avoiding the problem of insufficient capacity caused by the system parameter required for the terminal to access the cell being carried by the SIB1. In addition, the message allocation can be definite and clear through configuring the dedicated carrier message for the system parameter required for the terminal to access the cell.

According to embodiments of the present disclosure, there is provided a method for sending a system message, applied to a network device. The method for sending a system message includes the following.

In step S1/1, a first physical downlink control channel (PDCCH) is sent, where the first PDCCH includes a modulation control parameter of a dedicated system message.

In step S2/1, the dedicated system message is sent, where the dedicated system message includes a system parameter required for a terminal to access a cell.

In some embodiments, the system parameter includes at least one of the following: a first parameter for determining whether to allow access to a cell, or a second parameter for performing cell access.

In some embodiments, the second parameter for performing cell access is a second parameter for performing cell access after determining that access to a cell is allowed.

In some embodiments, the modulation control parameter includes at least one of the following: a modulation encoding mode or a frequency domain position.

According to embodiments of the present disclosure, there is provided a method for sending a system message, applied to a network device. The method for sending a system message include the following.

In step S1/1', a second physical downlink control channel (PDCCH) is sent, where the second PDCCH includes a modulation control parameter of the dedicated system message, the second PDCCH includes a modulation control parameter of a first type of system information block (SIB1), and the second PDCCH is different from the first PDCCH.

In step S2/1', the dedicated system message is sent, where the dedicated system message includes a system parameter required for the terminal to access a cell.

According to embodiments of the present disclosure, there is provided a method for sending a system message, applied to a network device. The method for sending a system message include the following.

In step S1/1', a first type of system information block (SIB1) is sent, where the first type of system information block (SIB1) includes a modulation control parameter of the dedicated system message.

In step S2/1', the dedicated system message is sent, where the dedicated system message includes a system parameter required for the terminal to access a cell.

Figure 9:
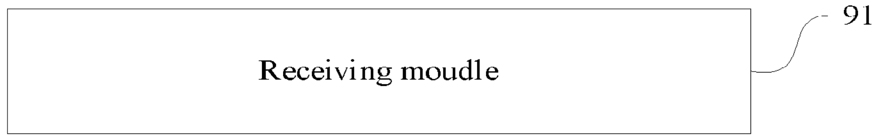
FIG. 9 is a structural diagram of an apparatus for receiving a system message illustrated according to some embodiments of the present disclosure.

According to embodiments of the present disclosure, there is provided an apparatus for receiving a system message, applied to a terminal. Referring to FIG. 9, FIG. 9 is a structural diagram of an apparatus for receiving a system message illustrated according to some embodiments of the present disclosure. As shown in FIG. 9, the apparatus for receiving a system message includes a receiving module 91.

The receiving module 91 is configured to receive a dedicated system message, where the dedicated system message includes a system parameter required for the terminal to access a cell.

In some embodiments, the dedicated system message is not within a first type of system information block (SIB1).

In some embodiments, the system parameter includes at least one of the following: a first parameter for determining whether to allow access to a cell, or a second parameter for performing cell access.

Among the, the second parameter for performing cell access is a second parameter for performing cell access after determining that the access to a cell is allowed.

In some embodiments, the second parameter includes at least one of the following:

- configuration information of a downlink bandwidth part (DL BWP);
- configuration information of an uplink bandwidth part (UL BWP);
- configuration information of a downlink physical channel; or
- configuration information of an uplink physical channel.

In some embodiments, the receiving module 91 is further configured to receive a first type of system information block (SIB1), where the first type of system information block (SIB1) includes a transmission opportunity configuration parameter corresponding to the dedicated system message.

The apparatus further includes a detection module configured to detect the dedicated system message according to the transmission opportunity configuration parameter.

In some embodiments, the receiving module 91 is further configured to receive a first type of system information block (SIB1), where the first type of system information block (SIB1) includes a configuration parameter of a first initial downlink bandwidth part (DL BWP); and the receiving module 91 is further configured to receive the dedicated system message on the first initial downlink bandwidth part (DL BWP).

In some embodiments, the receiving module 91 is further configured to receive a master information block (MIB), where the master information block (MIB) includes a configuration parameter of a second initial downlink bandwidth part (DL BWP); and the receiving module 91 is further configured to receive the dedicated system message on the second initial downlink bandwidth part (DL BWP).

In some embodiments, the receiving module 91 is further configured to perform one of the following:

- receiving a first physical downlink control channel (PDCCH), where the first PDCCH includes a modulation control parameter of the dedicated system message;
- receiving a first type of system information block (SIB1), where the first type of system information block (SIB1) includes a modulation control parameter of the dedicated system message;
- receiving a second physical downlink control channel (PDCCH), where the second PDCCH includes a modulation control parameter of the dedicated system message, the second PDCCH includes a modulation control parameter of the first type of system information block (SIB1), and the second PDCCH is different from the first PDCCH.

Figure 10:
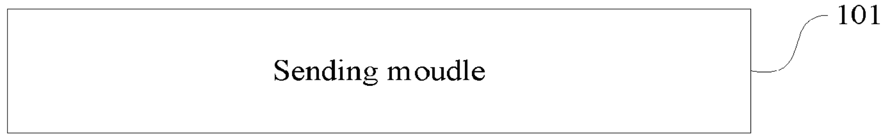
FIG. 10 is a structural diagram of an apparatus for sending a system message illustrated according to some embodiments of the present disclosure.

According to embodiments of the present disclosure, there is provided an apparatus for sending a system message, applied to a network device. Referring to FIG. 10, FIG. 10 is a structural diagram of an apparatus for sending a system message illustrated according to some embodiments of the present disclosure. As shown in FIG. 10, the apparatus for sending a system message includes a sending module 101.

The sending module 101 is configured to send a dedicated system message, where the dedicated system message includes a system parameter required for a terminal to access a cell.

In some embodiments, the dedicated system message is not within a first type of system information block (SIB1).

In some embodiments, the system parameter includes at least one of the following: a first parameter for determining whether to allow access to a cell, or a second parameter for performing cell access.

In some embodiments, the second parameter for performing cell access is a second parameter for performing cell access after determining that the access to a cell is allowed.

In some embodiments, the second parameter includes at least one of the following:

configuration information of a downlink bandwidth part (DL BWP);

configuration information of an uplink bandwidth part (UL BWP);

configuration information of a downlink physical channel; or configuration information of an uplink physical channel.

In some embodiments, the sending module 101 is further configured to send a first type of system information block (SIB1), where the first type of system information block (SIB1) includes a transmission opportunity configuration parameter corresponding to the dedicated system message.

The transmission opportunity configuration parameter is used to enable the terminal to detect the dedicated system message according to the transmission opportunity configuration parameter.

In some embodiments, the sending module 101 is further configured to send a first type of system information block (SIB), where the first type of system information block (SIB1) includes a configuration parameter of a first initial downlink bandwidth part (DL BWP); and the sending module 101 is further configured to send the dedicated system message on the first initial downlink bandwidth part (DL BWP).

In some embodiments, the sending module 101 is further configured to send a master information block (MIB), where the master information block (MIB) includes a configuration parameter of a second initial downlink bandwidth part (DL BWP); and the sending module 101 is further configured to send the dedicated system message on the second initial downlink bandwidth part (DL BWP).

In some embodiments, the sending module 101 is further configured to perform at least one of the following:

sending a first physical downlink control channel (PDCCH), where the first PDCCH includes a modulation control parameter of the dedicated system message;

sending a first type of system information block (SIB1), where the first type of system information block (SIB1) includes a modulation control parameter of the dedicated system message;

sending a second physical downlink control channel (PDCCH), where the second PDCCH includes a modulation control parameter of the dedicated system message, the second PDCCH includes a modulation control parameter of the first type of system information block (SIB1), and the second PDCCH is different from the first PDCCH.

According to embodiments of the present disclosure, there is further provided an apparatus for receiving a system message, applied to a terminal, and including a processor and a memory, configured to store an instruction executable by a processor. Among them, the processor is configured to execute the method for receiving the system message.

According to embodiments of the present disclosure, there is further provided an apparatus for sending a system message, applied to a network device, and including a processor and a memory, configured to store an instruction executable by a processor. Among them, the processor is configured to execute the method for sending the system message.

According to embodiments of the present disclosure, there is further provided a non-transitory computer-readable storage medium; when an instruction in the storage medium is executed by a processor of a mobile terminal, the terminal is enabled to execute the method for receiving the system message.

According to embodiments of the present disclosure, there is further provided a non-transitory computer-readable storage medium; when an instruction in the storage medium is executed by a processor of a mobile terminal, the network device is enabled to execute the method for sending the system message.

With regard to the apparatus in the above embodiments, the specific manner in which each module performs an operation has been described in detail in the embodiments related to the method, and will not be described in detail here.

Figure 11:
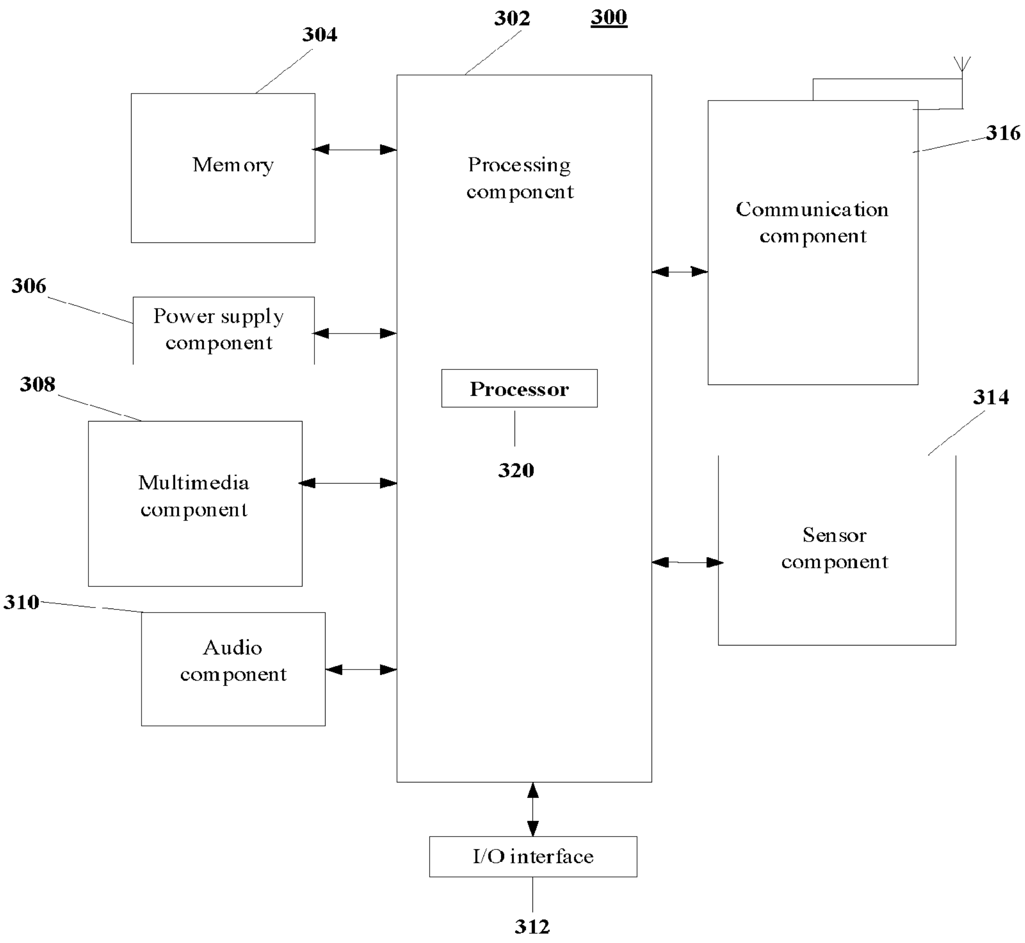
FIG. 11 is a structural diagram of an apparatus for receiving a system message illustrated according to some embodiments of the present disclosure.

FIG. 11 is a block diagram of an apparatus 300 for sending a system message illustrated according to some embodiments of the present disclosure. For example, the apparatus 300 may be a mobile phone, a computer, a digital broadcast terminal, a message transceiving device, a game console, a tablet device, a medical device, a gym device, a personal digital assistant, etc.

Referring to FIG. 11, the apparatus 300 may include one or more of following components: a processing component 302, a memory 304, a power component 306, a multimedia component 308, an audio component 310, an input/output (I/O) interface 312, a sensor component 314, and a communication component 316.

The processing component 302 generally controls the overall operation of the apparatus 300, such as operations associated with display, telephone calls, data communications, camera operations, and recording operations. The processing component 302 may include one or more processors 320 to execute instructions to complete all or part of the steps of the methods described above. In addition, the processing component 302 may include one or more modules to facilitate interaction between the processing component 302 and other components. For example, the processing component 302 may include a multimedia module to facilitate interaction between the multimedia component 308 and the processing component 302.

The memory 304 is configured to store various types of data to support operations at the apparatus 300. Examples of such data include instructions for any application or method operating on the apparatus 300, contact data, phonebook data, messages, pictures, videos, or the like. The memory 304 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 306 provides power to various components of the apparatus 300. The power component

306 may include a power management system, one or more power sources, and other components associated with generating, managing, and distributing power for the apparatus 300.

The multimedia component 308 includes a screen providing an output interface between the apparatus 300 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding, and gestures on the touch panel. The touch sensor may not only sense a boundary of a touching or sliding action, but also detect a duration and pressure associated with the touching or sliding action. In some embodiments, the multimedia component 308 includes a front-facing camera and/or a rear-facing camera. When the apparatus 300 is in an operation mode, such as a photographing mode or a video mode, the front-facing camera and/or the rear-facing camera may receive external multimedia data. Each of the front-facing camera and the rear-facing camera may be a fixed optical lens system, or may have a focal length and an optical zoom capability.

The audio component 310 is configured to output and/or input an audio signal. For example, the audio component 310 includes a microphone (MIC) configured to receive an external audio signal when the apparatus 300 is in an operating mode, such as a call mode, a recording mode, and a speech recognition mode. The received audio signal may be further stored in the memory 304 or be sent via the communication component 316. In some embodiments, the audio component 310 further includes a speaker configured to output an audio signal.

The I/O interface 312 provides an interface between the processing component 302 and a peripheral interface module, and the peripheral interface module may be a keyboard, a click wheel, a button, or the like. The button may include, but is not limited to, a home button, a volume button, a start button, and a lock button.

The sensor component 314 includes one or more sensors for providing status assessments for various aspects of the apparatus 300. For example, the sensor component 314 may detect the open/closed state of the apparatus 300, and the relative positioning of the components; for example, these components may be the display and the keypad of the apparatus 300. The sensor component 314 may also detect the position change of the apparatus 300 or a component of the apparatus 300, the presence or absence of contact between the user and the apparatus 300, the orientation or the acceleration/deceleration of the apparatus 300, and the temperature change of the apparatus 300. The sensor component 314 may include a proximity sensor configured to detect the presence of nearby objects without any physical contact. The sensor component 314 may also include an optical sensor, such as a CMOS or CCD image sensor, for use in an imaging application. In some embodiments, the sensor component 314 may further include an acceleration sensor, a gyroscope sensor, a magnetic sensor, a pressure sensor, or a temperature sensor.

The communication component 316 is configured to facilitate wired or wireless communication between the apparatus 300 and other devices. The apparatus 300 may access a wireless network based on any communication standard, such as WiFi, 4G or 5G, or a combination of them. In some embodiments, the communication component 316 receives broadcast signals or broadcast related information from an external broadcast management system via a broadcast channel. In some embodiments, the communication component 316 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 300 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for performing the methods described above.

In some embodiments, there is further provided a non-transitory computer-readable storage medium including an instruction, such as a memory 304 including an instruction. The instruction may be executed by the processor 320 of the apparatus 300 to complete the above method. For example, the non-transitory computer-readable storage medium may be a ROM, a random access memory (RAM), a CD-ROM, a magnetic tape, a floppy disk, an optical data storage device, etc.

Figure 12:
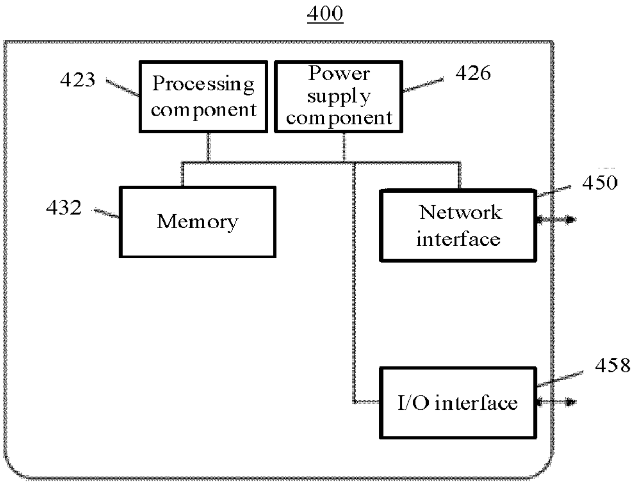
FIG. 12 is a structural diagram of an apparatus for sending a system message illustrated according to some embodiments of the present disclosure.

FIG. 12 is a block diagram of an apparatus 400 for sending a system message illustrated according to some embodiments of the present disclosure. For example, the apparatus 400 may be provided as a server. Referring to FIG. 10, the apparatus 400 includes a processing component 422 that further includes one or more processors, and memory resources represented by the memory 432 for storing instructions executable by the processing component 422, such as an application. The application stored in the memory 432 may include one or more modules, each of which corresponding to a set of instructions. In addition, the processing component 422 is configured to execute the instructions to perform the above method.

The apparatus 400 may also include a power supply component 426 configured to perform power supply management of the apparatus 400, a wired or wireless network interface 450 configured to connect the apparatus 400 to a network, and an input/output (I/O) interface 458. The apparatus 400 may operate based on an operating system stored in the memory 432, such as Windows Server, MAC OS X, Unix, Linux, FreeBSD, etc.

According to embodiments of the present disclosure, there is provided a method and apparatus for receiving or sending a system message, and a readable storage medium.

According to a first aspect of the embodiments of the present disclosure, there is provided a method for receiving a system message, applied to a terminal, and including:

receiving a dedicated system message, where the dedicated system message includes a system parameter required for the terminal to access a cell.

In some embodiments, the dedicated system message is not within a first type of system information block.

In some embodiments, the system parameter includes at least one of following:

a first parameter for determining whether to allow access to a cell; or a second parameter for performing cell access.

In some embodiments, the second parameter includes at least one of following:

configuration information of a downlink bandwidth part (DL BWP);

configuration information of an uplink bandwidth part (UL BWP);

configuration information of a downlink physical channel; or configuration information of an uplink physical channel.

In some embodiments, the method further includes receiving a first type of system information block, where the first type of system information block includes a transmission opportunity configuration parameter corresponding to the dedicated system message, and detecting the dedicated system message according to the transmission opportunity configuration parameter.

In some embodiments, the method further includes receiving a first type of system information block, where the first type of system information block includes a configuration parameter of a first initial downlink bandwidth part (DL BWP), Receiving the dedicated system message includes receiving the dedicated system message on the first initial downlink bandwidth part (DL BWP).

In some embodiments, the method further includes receiving a master information block (MIB), where the master information block (MIB) includes a configuration parameter of a second initial downlink bandwidth part (DL BWP). Receiving the dedicated system message includes receiving the dedicated system message on the second initial downlink bandwidth part (DL BWP).

In some embodiments, the method includes one of following:

receiving a first physical downlink control channel (PDCCH), where the first PDCCH includes a modulation control parameter of the dedicated system message;

receiving a first type of system information block, where the first type of system information block includes a modulation control parameter of the dedicated system message; or receiving a second physical downlink control channel (PDCCH), where the second PDCCH includes a modulation control parameter of the dedicated system message, the second PDCCH includes a modulation control parameter of the first type of system information block, and the second PDCCH is different from the first PDCCH.

According to a second aspect of the embodiments of the present disclosure, there is provided a method for sending a system message, applied to a network device, and including:

sending a dedicated system message, where the dedicated system message includes a system parameter required for a terminal to access a cell.

In some embodiments, the dedicated system message is not within a first type of system information block.

In some embodiments, the system parameter includes at least one of following:

a first parameter for determining whether to allow access to a cell; or a second parameter for performing cell access.

In some embodiments, the second parameter includes at least one of following:

configuration information of a downlink bandwidth part (DL BWP);

configuration information of an uplink bandwidth part (UL BWP);

configuration information of a downlink physical channel; or configuration information of an uplink physical channel.

In some embodiments, the method further includes sending a first type of system information block, where the first type of system information block includes a transmission opportunity configuration parameter corresponding to the dedicated system message, and the transmission opportunity configuration parameter is used for enabling the terminal to detect the dedicated system message according to the transmission opportunity configuration parameter.

In some embodiments, the method further includes sending a first type of system information block, where the first type of system information block includes a configuration parameter of a first initial downlink bandwidth part (DL BWP). Sending the dedicated system message includes sending the dedicated system message on the first initial downlink bandwidth part (DL BWP).

In some embodiments, the method further includes sending a master information block (MIB), where the master information block (MIB) includes a configuration parameter of a second initial downlink bandwidth part (DL BWP). Sending the dedicated system message includes sending the dedicated system message on the second initial downlink bandwidth part (DL BWP).

In some embodiments, the method includes one of following sending a first physical downlink control channel (PDCCH), where the first PDCCH includes a modulation control parameter of the dedicated system message, sending a first type of system information block, where the first type of system information block includes a modulation control parameter of the dedicated system message, or sending a second physical downlink control channel (PDCCH), where the second PDCCH includes a modulation control parameter of the dedicated system message, the second PDCCH includes a modulation control parameter of the first type of system information block, and the second PDCCH is different from the first PDCCH.

According to a third aspect of the embodiments of the present disclosure, there is provided an apparatus for receiving a system message, applied to a terminal, and including:

a receiving module, configured to receive a dedicated system message, where the dedicated system message includes a system parameter required for the terminal to access a cell.

According to a fourth aspect of the embodiments of the present disclosure, there is provided an apparatus for sending a system message, applied to a network device, and including a sending module, configured to send a dedicated system message, where the dedicated system message includes a system parameter required for a terminal to access a cell.

According to a fifth aspect of the embodiments of the present disclosure, there is provided an apparatus for receiving a system message, applied to a terminal, and including a processor and a memory configured to store an instruction executable by the processor. The processor is configured to perform the method for receiving a system message.

According to a sixth aspect of the embodiments of the present disclosure, there is provided an apparatus for sending a system message, applied to a network device, and including a processor and a memory, configured to store an instruction executable by the processor. The processor is configured to perform the method for sending a system message.

According to a seventh aspect of the embodiments of the present disclosure, there is provided a non-transitory computer-readable storage medium. When an instruction in the storage medium is executed by a processor of a mobile terminal, a terminal is enabled to perform the method for receiving a system message, or, a network device is enabled to perform the method for sending a system message.

The technical solution provided in the embodiments of the present disclosure may include the following beneficial effects: a dedicated system message is configured for a system parameter required for a terminal to access a cell, and the dedicated system message is only used to carry the system parameter required for the terminal to access the cell, so that the capacity of the dedicated system message can be determined according to the information amount of the system parameter required for the terminal to access the cell, thus making the capacity of the dedicated carrier message more reasonable, and preventing the waste of air-interface resources.

Other implementations of the embodiments of the present disclosure will be apparent to those skilled in the art from consideration of the description and practice of the invention disclosed here. The present application is intended to cover any variations, uses, or adaptations of the embodiments of the present disclosure, which follow the general principles of the embodiments of the present disclosure and include common general knowledge or conventional technical means in the art not disclosed in the present disclosure. The description and embodiments are considered as examples only, with the true scope and spirit of the embodiments of the present disclosure being indicated by the following claims.

It should be understood that the embodiments of the present disclosure are not limited to the precise structures that have been described above and shown in the accompanying drawings, and various modifications and changes may be made without departing from the scope of the embodiments of the present disclosure. The scope of the embodiments of the present disclosure is limited only by the appended claims.

INDUSTRIAL APPLICABILITY

The system parameter required for the terminal to access the cell may be used as the cell-level parameter of the terminal, and the dedicated system message may be configured for the system parameter required for the terminal to access the cell. Therefore, the dedicated system message is only used to carry the system parameter required for the terminal to access the cell, so that the capacity of the dedicated system message can be determined according to the information amount of the system parameter required for the terminal to access the cell, thus making the capacity of the dedicated carrier message more reasonable, and preventing the waste of air-interface resources.

What is claimed is:

1. A method for receiving a system message, applied to a terminal, and comprising:

receiving a dedicated system message, wherein the dedicated system message comprises a system parameter required for the terminal to access a cell;

wherein the system parameter comprises at least one of following:

a first parameter for determining whether to allow access to a cell; or a second parameter for performing cell access;

and wherein the method further comprises one of following:

receiving a first physical downlink control channel (PDCCH), wherein the first PDCCH comprises a modulation control parameter of the dedicated system message;

receiving a first type of system information block. wherein the first type of system information block comprises a modulation control parameter of the dedicated system message; or receiving a second physical downlink control channel (PDCCH), wherein the second PDCCH comprises a modulation control parameter of the dedicated system message, the second PDCCH comprises a modulation control parameter of the first type of system information block, and the second PDCCH is different from the first PDCCH.

2. The method according to claim 1, wherein the dedicated system message is not within the first type of system information block.

3. The method according to claim 1, wherein the second parameter comprises at least one of following:

configuration information of a downlink bandwidth part (DL BWP);

configuration information of an uplink bandwidth part (UL BWP);

configuration information of a downlink physical channel; or configuration information of an uplink physical channel.

4. The method according to claim 1, wherein the first type of system information block further comprises a transmission opportunity configuration parameter corresponding to the dedicated system message; and detecting the dedicated system message according to the transmission opportunity configuration parameter.

5. The method according to claim 1, wherein the first type of system information block further comprises a configuration parameter of a first initial downlink bandwidth part (DL BWP); and receiving the dedicated system message comprises:

receiving the dedicated system message on the first initial downlink bandwidth part (DL BWP).

6. The method according to claim 1, wherein the method further comprises:

receiving a master information block (MIB), wherein the master information block (MIB) comprises a configuration parameter of a second initial downlink bandwidth part (DL BWP); and receiving the dedicated system message comprises:

receiving the dedicated system message on the second initial downlink bandwidth part (DL BWP).

7. A method for sending a system message, applied to a network device, and comprising:

sending a dedicated system message, wherein the dedicated system message comprises a system parameter required for a terminal to access a cell;

wherein the system parameter comprises at least one of following:

a first parameter for determining whether to allow access to a cell; or a second parameter for performing cell access;

and wherein the method further comprises one of following:

sending a first physical downlink control channel (PDCCH), wherein the first PDCCH comprises a modulation control parameter of the dedicated system message;

sending a first type of system information block, wherein the first type of system information block comprises a modulation control parameter of the dedicated system message; or sending a second physical downlink control channel (PDCCH), wherein the second PDCCH comprises a modulation control parameter of the dedicated system message, the second PDCCH comprises a modulation control parameter of the first type of system information block, and the second PDCCH is different from the first PDCCH.

8. The method according to claim 7, wherein the dedicated system message is not within the first type of system information block.

9. The method according to claim 7, wherein the second parameter comprises at least one of following:

configuration information of a downlink bandwidth part (DL BWP);

configuration information of an uplink bandwidth part (UL BWP);

configuration information of a downlink physical channel; or configuration information of an uplink physical channel.

10. The method according to claim 7, wherein the first type of system information block further comprises a transmission opportunity configuration parameter corresponding to the dedicated system message; and the transmission opportunity configuration parameter is used for enabling the terminal to detect the dedicated system message according to the transmission opportunity configuration parameter.

11. The method according to claim 7, wherein the first type of system information block further comprises a configuration parameter of a first initial downlink bandwidth part (DL BWP); and sending the dedicated system message comprises:

sending the dedicated system message on the first initial downlink bandwidth part (DL BWP).

12. The method according to claim 7, wherein the method further comprises:

sending a master information block (MIB), wherein the master information block (MIB) comprises a configuration parameter of a second initial downlink bandwidth part (DL BWP); and sending the dedicated system message comprises:

sending the dedicated system message on the second initial downlink bandwidth part (DL BWP).

13. An apparatus for receiving a system message, applied to a terminal, and comprising:

a processor; and a memory, configured to store an instruction executable by the processor;

wherein the processor is configured to perform:

receiving a dedicated system message, wherein the dedicated system message comprises a system parameter required for the terminal to access a cell;

wherein the system parameter comprises at least one of following:

a first parameter for determining whether to allow access to a cell; or a second parameter for performing cell access;

and wherein the processor is further configured to perform one of following:

receiving a first physical downlink control channel (PDCCH), wherein the first PDCCH comprises a modulation control parameter of the dedicated system message:

receiving a first type of system information block, wherein the first type of system information block comprises a modulation control parameter of the dedicated system message; or receiving a second physical downlink control channel (PDCCH), wherein the second PDCCH comprises a modulation control parameter of the dedicated system message, the second PDCCH comprises a modulation control parameter of the first type of system information block, and the second PDCCH is different from the first PDCCH.

14. An apparatus for sending a system message, applied to a network device, and comprising:

a processor; and a memory, configured to store an instruction executable by the processor;

wherein the processor is configured to perform the method for sending the system message according to claim 9.

15. A non-transitory computer-readable storage medium, wherein when an instruction in the storage medium is executed by a processor of a terminal, the terminal is enabled to perform the method for receiving the system message according to claim 1.

16. A non-transitory computer-readable storage medium, wherein when an instruction in the non-transitory computer-readable medium is executed by a processor of a network device, the network device is enabled to perform the method for sending the system message according to claim 7.

* * * * *